United States Patent [19]

Morgan

[11] 4,017,650
[45] Apr. 12, 1977

[54] METHOD OF COATING USING ACTIVE RADIATION CURABLE POLYENE-POLYTHIOL COMPOSITIONS

[75] Inventor: Charles R. Morgan, Brookeville, Md.

[73] Assignee: W. R. Grace & Co., New York, N.Y.

[22] Filed: May 21, 1976

[21] Appl. No.: 688,643

Related U.S. Application Data

[62] Division of Ser. No. 614,580, Sept. 18, 1975, Pat. No. 3,984,297, which is a division of Ser. No. 461,207, April 15, 1974, Pat. No. 3,945,982.

[52] U.S. Cl. .............................. 427/53; 204/159.22; 427/54
[51] Int. Cl.$^2$ ........................................... B05D 3/06
[58] Field of Search ............ 427/54, 44, 53, 385 R; 204/159.22; 260/77.5 AP, 77.5 AQ, 77.5 BB

[56] References Cited

UNITED STATES PATENTS 3,697,395  10/1972  Kehr et al. ........................ 427/54
3,839,354  10/1974  Habermeier et al. ...... 260/77.5 AQ Primary Examiner—John H. Newsome
Attorney, Agent, or Firm—Richard P. Plunkett; Kenneth E. Prince

[57] ABSTRACT

A curable composition comprising compatible polyene and polythiol in which both the components are derived from a hydantoin glycol. The polyene is typically a reaction product of N,N'-bis(2-hydroxyethyl) dimethylhydantoin, a diisocyanate and an unsaturated alcohol, e.g., allyl alcohol. The polythiol is typically a reaction product of N,N'-bis(2-hydroxyethyl) dimethylhydantoin and a mercapto carboxylic acid, e.g., β-mercaptopropionic acid. Upon exposure to a free radical generator, e.g., actinic radiation, this polyene-polythiol composition cures to solid, insoluble, chemically resistant, cross-linked polythioether products.

3 Claims, No Drawings

METHOD OF COATING USING ACTIVE RADIATION CURABLE POLYENE-POLYTHIOL COMPOSITIONS

This is a division of application Ser. No. 614,580 filed Sept. 18, 1975, now U.S. Pat. No. 3,984,297, which was a division of application Ser. No. 461,207 filed Apr. 15, 1974, now U.S. Pat. No. 3,945,982.

BACKGROUND OF THE INVENTION

This invention relates to a curable polymer composition. More particularly, this invention relates to a solvent soluble polyene-polythiol curable composition, method of preparing the same, as well as curing the polyene-polythiol composition in the presence of a free radical generator to solid, cross-linked solvent-insoluble materials.

It is known that polymers are curable by polythiols in the presence of free radical generators such as actinic radiation to solid polythioether containing resinous or elastomeric products. The commercially available polythiols, e.g., mercaptocarboxylate esters of polyols used in curing afford cured polythioether products having a low percent elongation on failure. However there are several end uses wherein a coating must have a relatively high elongation in order to be operable. For example it is necessary that a coating on a bottle cap have a relatively high elongation since after it is applied and cured on the metal blank, the blank is subsequently formed by extrusion or otherwise into cap form which necessitates that the coating have sufficient elongation to follow the contours of the thus formed cap without rupture. Additionally in bottle coating it is necessary that the cured coating have high elongation to prevent glass shattering. Thus a curable coating having a high elongation after curing is desirous.

In accordance with this invention, a curable polymer composition can be prepared from compatible polyene and polythiol components derived from a hydrantion glycol. This polyene and polythiol mixture is a highly reactive composition which is capable of being photocured when exposed to actinic radiation in the presence of a UV sensitizer to insoluble polythioether containing materials which exhibit excellent physical and chemical properties. For example, wire coatings formed from the cured polyene and polythiol composition are capable of withstanding severe temperature environments for extended periods. The subject cured materials resist strongly acid etching solutions or high alkaline conditions. Additionally the cured polythioether product from the polyenes and polythiols herein has remarkable flexibility and high elongation at failure as will be shown in an example hereinafter. The desirable characteristics of the cured materials make the hydantoin glycol derived polyene-polythiol curable composition particularly useful as coatings on wire and formable metals.

Generally speaking, the novel curable composition is comprised of a polyene component containing at least 2 reactive carbon to carbon unsaturated bonds per molecule which is a reaction product of N,N'-bis(2-hydroxyethyl) dimethylhydantoin and at least one unsaturated organic compound such as ene-acid or ene-isocyanate; and a polythiol component containing at least two thiol groups, which is the reaction product of N,N'-bis(2-hydroxyethyl) dimethylhydantoin and a mercaptocarboxylic acid.

The formation of such polymers may be schematically represented by the following nonlimiting equation, wherein the unsaturated organic compound reactant is an ene-isocyanate having reactive allylic end groups as illustrated by a reaction product of one mole of 2,4-toluene diisocyanate with one mole of allyl alcohol:

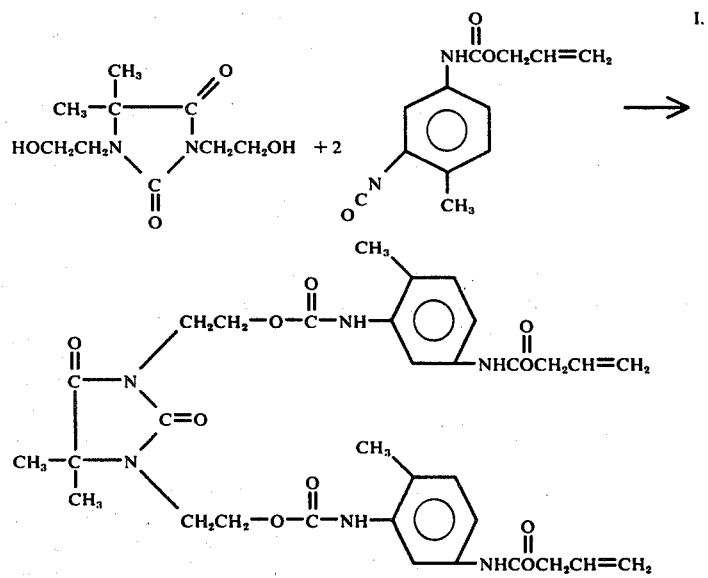

Similarly, the formation of the polythiol may be represented by the nonlimiting equation illustrating β-mercaptopropionic acid as the mercaptocarboxylic reactant:

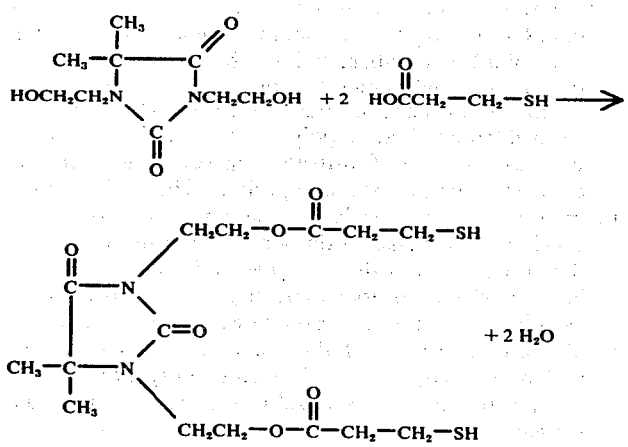

Furthermore, the hydantoin glycols are generally commercially available materials. The operable hydantoin glycols include not only N,N'-bis(2-hydroxyethyl) dimethylhydantoin, but also polyethoxylated derivatives thereof. These polyethoxylated derivatives are formed by the addition of the desired number of moles of ethylene oxide to the N,N'-bis(2-hydroxyethyl) dimethylhydantoin, i.e., by a conventional epoxide ring-opening addition reaction.

The aforedescribed hydantoin glycols are operable starting materials for the formation of both the polyene and polythiol.

In the curable polyene-polythiol containing compositions, the hydantoin glycols backbone may be either identical or different for both the polyene and polythiol components.

One group of operable polyenes containing hydantoin glycol backbones are unsaturated urethane derivatives. These polyenes, i.e., unsaturated urethane derivatives of hydantoin glycol may be represented by the general formula:

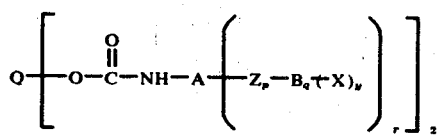

wherein Q is the hydantoin glycol moiety remaining after the two hydroxyl groups of the hydantoin glycol have reacted to form two urethane, i.e.,

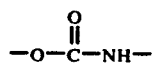

linkages; A and B are polyvalent organic radical members free of reactive carbon to carbon unsaturation and containing group members such as aryl, substituted aryl, aralkyl, substituted aralkyl, cycloalkyl, substituted cycloalkyl, alkyl and substituted alkyl containing 1 to 36 carbon atoms and mixtures thereof. These group members can be connected by a chemically compatible linkage such as —O—, —S—, carboxylate, carbonate, carbonyl, urethane and substituted urethane, urea and substituted urea, amide and substituted amide, amine and substituted amine and hydrocarbon. Z is a divalent chemically compatible linkage such as

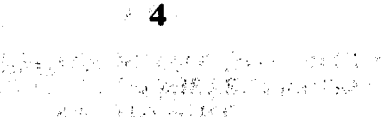

—O— and —S—, preferably $$-NH-\overset{O}{\underset{\|}{C}}-O-.$$

Preferred exampls of operable aryl members are either phenyl or naphthyl, and of operable cycloalkyl members which have from 3 to 8 carbon atoms. Likewise, preferred substituents on the substituted members may be such groups as chloro, bromo, nitro, acetoxy, acetamido, phenyl, benzyl, alkyl and alkoxy of 1 to 9 carbon atoms, and cycloalkyl of 3 to 8 carbon atoms.

X is a member selected from the group consisting of:
a. $-(CH_2)_d-CR'=CHR$
b. $-O(CH_2)_d-CR'=CHR$
c. $-S-(CH_2)_d-CR'=CHR$
d. $-(CH_2)_d-C\equiv CR$
e. $-O-(CH_2)_d-C\equiv CR$
f. $-S-(CH_2)_d-C\equiv CR$ and mixtures thereof; and R and R' each are independently either a hydrogen or methyl radical, preferably a hydrogen radical; and $d$, $p$ and $q$ each are integers from 0 to 1; $y$ is an integer from 1 to 10, preferably 1 to 5; $r$ is an integer of at least 1, preferably from 1 to 4, and more particularly from 1 to 2.

As used herein, polyenes and polyynes refer to simple or complex species of alkenes or alkynes having a multiplicity of pendant or terminally reactive carbon to carbon unsaturated functional groups per average molecule. For example, a diene is a polyene that has two reactive carbon to carbon double bonds per averge molecule, while a diyne is a polyyne that contains two reactive carbon to carbon triple bonds per average molecule; a solid polyene which is a reaction product of a styrene-allyl alcohol copolymer having about 8 hydroxyl groups per average molecule and a reactive unsaturated monoisocyanate having one terminal reactive carbon to carbon double bond per average molecule is a complex polyene which contains in its structure 8 reactive carbon to carbon double bonds per average molecule. For purposes of brevity, all these classes of compounds will be referred to hereafter as polyenes.

In defining the position of the reactive functional carbon to carbon unsaturation, the term terminal is intended to mean that functional unsaturation is at an end of the main chain in the molecule. The term pendant means that the reactive carbon to carbon unsaturation is located terminal in a branch of the main chain as contrasted to a position at or near the ends of the main chain. For purposes of brevity, all of these positions are referred to herein generally as terminal unsaturation.

Functionality as used herein refers to the average number of one or thiol groups per molecule in the polyene or polythiol, respectively. For example, a triene is a polyene with an average of three reactive carbon to carbon unsaturated groups per molecule, and thus has a functionality (f) of three. A dithiol is a polythiol with an average of two thiol groups per molecule and thus has a functionality (f) of two.

The term reactive unsaturated carbon to carbon groups means groups which will react under proper conditions as set forth herein with thiol groups to yield the thioether linkage

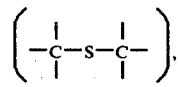

as contasted to the term unreactive carbon to carbon unsaturation which means

groups found in aromatic nuclei (cyclic structures exemplified by benzene, pyridine, anthracene, and the like) which do not under the same conditons react with thiols to give thioether linkages. For purposes of brevity, this term will hereinafter be referred to generally as reactive unsaturation or a reactive unsaturated compound.

As used herein, the term polyvalent means having a valence of two or greater.

A general method of forming the urethane-containing hydantoin glycol based polyene is to react the hydantoin glycol material represented by a general formula Q—(OH)$_2$, iin which Q is as hereinbefore set forth; with at least one reactive unsaturated isocyanateof the general formula NCO—A—[Z$_p$—B$_q$—(X)$_y$]$_r$ in which the members A, Z, B, X and the integers $p$, $q$, $y$ and $r$ are as hereinbefore set forth.

The term reactive unsaturated isocyanate will hereinafter be referred to as an ene-isocyante or an yne-isocyanate.

The reaction is carried out in a moisture free atmosphere at atmospheric pressure at a temperature in the range from about 30° to 100° C, preferably from about 40° to 80° C, for a period of about 10 minutes to about 24 hours. The reaction is preferably a one step reaction wherein all the reactants are charged together. The ene-isocyanate or yne-isocyanate is added in a stoichiometric amount necessary to react with the hyroxy groups in the hydantoin clycol. The reaction, if desired, may be carried out in the presence of a catalyst and inert solvent. Operable non-limiting catalysts include tin catalysts such as dibutyl tin dilaurate, stannous octoate; tertiary amines such as triethylene diamine or N,N,N',N'-tetramethyl-1,3-butanediamine, etc. Useful inert solvents include aromatic hydrocarbons, halogenated saturated aliphatic or aromatic hydrocarbons and mixtures thereof. Representative non-limiting examples include benzene, chlorobenzene, chloroform, 1,1,1-trichloroethane, 1,2-dichloroethane and the like.

Operable ene- or yne- isocyanates having the above defined general formula include, but are not limited to, simple monoeneisocyanates such as allyl isocyanate, 2-methallyl isocyanate, crotyl isocyanate, etc.

The aforementioned reactive unsaturated isocyanates are a group of compounds having the above general formula of operable ene- or yne-isocyanates wherein the integers $p$ and $q$ are 0 and $r$ is 1. Thus, the urethane hydantoin glycol based polyenes formed from these reactive unsaturated isocyanates may be represented by simplifying the general formula for the polyenes to the following specific formula:

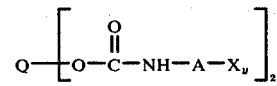

wherein preferably $y$ is 1 and the other members being as hereinbefore set forth.

Other operable ene- or yne-isocyanates are those prepared by reacting a polyisocyanate of the general formula A—NCO)$_x$, in which $x$ is at least 2 and A is as hereinbefore set forth; with a reactive unsaturated alcohol of the general formula [(X)$_y$—B—OH in which B, X and $y$ are as hereinbefore set foth.

The above polyisocyanate and alcohol reactants are added in such stoichiometric amounts that x-1 isocyanate groups react to give x-1 urethane linkages.

Operable non-limiting examples of starting polyisocyanate reactants include hexamethylenediisocyanate, tolylene diisocyanate, xylylene diisocyanate, methylenebis(phenyl isocyanate), 4,4'-methylene(cyclohexyl isocyanate, 1-methoxy-2,4,6-benzenetrisocyanate, 2,4,4'-triisocyanatodiphenylether, diphenylmethane tetraisocyanates, polyisocyanates having various functional groups such as N,N',N''-tris(isocyanatohexyl)-biuret or adducts of polyalcohols and diisocyanates which have at least 2 free isocyanate groups. Adduct of trimethylolpropane and 3 moles of toluene diisocyanate, is suitable.

Illustrative of the operable reactive unsaturated alcohols which may react with the polyisocyanates to give the desired ene-isocyante include but are not limited to allyl and methallyl alchol, crotyl alcohol, crotyl alcohol, ω-undecylenyl alcohol, 2-vinyloxyethanol, vinylhydroxyethyl sulfide, propargyl alcohol, 1-allylcyclopentanol, 2-methyl-3-butene-2-ol. Reactive unsaturated derivatives of polyhydric alcohols such as glycols, triols, tetraols, etc., are also suitable. Representative examples include trimethylolpropane or trimethylolethane diallyl ethers, pentaerythritol triallyl ether and the like. Mixtures of various reactive unsaturated alcohols are operable as well. A suitable ene-isocyanate prepared by treating one mole of trimethylbenzene triisocyanate with two moles of trimethylolpropane diallyl ether. The resulting urethane containing ene-isocyanate is a polyene having four reactive allyl ether groups per molecule. Mixtures of various ene- or yne-isocyantes are operable as well.

Another class of polyenes operable in forming the curable polyene-polythiol system of the subject invention are esters of hydantion glycol. Similarly, these polyenes may be represented by the general formula:

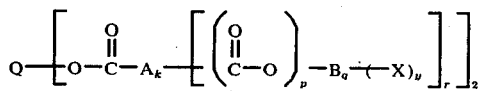

wherein Q is the hydantoin glycol moiety remaining after removal of the 2 hydroxyl groups from the said hydantoin glycol thereby forming an ester linkage; the members A, B, and X and integers $p$, $q$, $y$ and $r$ are as hereinbefore set forth in the urethane containing hydantoin glycol based polyene and $k$ is an integer from 0 to 1.

A general method of forming these esters is to react the hydantoin glycol represented by the aforedefined general formula Q—(OH)$_2$; with at least one reactive unsaturated monocarboxylic acid of the general formula:

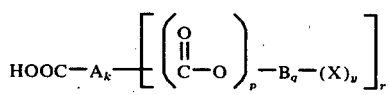

in which the members A, B and X, and the integers $k$, $p$, $q$, $y$ and $r$ are as hereinbefore set forth. The term reactive unsaturated carboxylic acid will hereinafter be referred to as an ene- and/or an yne-acid.

The esterification reaction may be carried out in a conventional manner in the presence of an acid catalyst, the water formed during the reaction being removed as an azeotrope.

Operable ene- or yen-acids include but are not limited to simple monoene-acids such as acrylic acid, methacrylic acid, vinylacetic acid, 5-hexenoic acid, 6-heptynoic acid, propiolic acid and the like.

These aforementioned reactive unsaturated acids are a group of acids having the above general formula of operable ene- or yne-acids wherein the integers $p$ and $q$ are 0, and $r$ is 1. Thus the ester containing hydantoin glycol based polyenes formed from these reactive unsaturated acids may be represented by simplifying the general formula for the polyenes to the following specific formula:

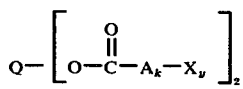

which, preferably, $y$ is 1 and the other members being as hereinbefore set forth.

Other operable acids are those containing more than one terminally reactive unsaturated group in the molecule. These may be prepared by reacting a polycarboxylic acid of the general formula A-(COOH)$_x$, in which $x$ is at least 2 and A is as hereinbefore set forth, with a reactive unsaturated alcohol of the general formula [(X)$_y$—B]—OH, in which B, X and $y$ are as hereinbefore set forth.

The above polycarboxylic acid and alcohol reactants are added in such stoichiometric amounts that $x$-1 carboxylic groups react to give $x$-1 ester linkages.

Operable polycarboxylic acids include but are not limited to dicarboxylic acids such as adipic, tartaric, succinic, terephthalic, etc.

Operable reactive unsaturated alcohol components are the same as described above as being suitable in forming ene-isocyanates. As an example, a suitable ene-acid can be prepared by reacting one mole of trimethylolpropane diallyl ether with one mole of succinic anhydride in the presence of pyridine as a solvent. The resulting succinate product contains a free carboxylic group as well as two reactive allyl ether groups.

The polythiol component of the curable composition is mercaptoester having two thiol groups per molecule. The polythiol is a reaction product of hydantoin glycol and at least one mercatocarboxylic acid. The polythiols may be represented by the following general formula:

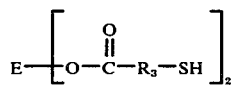

and E is the hydantoin glycol moiety remaining after removal of the 2 hydroxyl groups from the hydantoin glycol thereby forming 2 ester linkages; R$_3$ is a polyvalent organic radical member free of reactive carbon to carbon unsaturation and contains group members such as aryl, substituted aryl, aralkyl, substituted aralkyl, cycloalkyl, substituted cycloalkyl, alkyl and substituted alkyl groups containing 1 to 16 carbon atoms.

Preferred examples of operable aryl members are either phenyl or napthyl, and of operable cycloalkyl members which have from 3 to 8 carbon atoms. Likewise, preferred substituents on the substiuted members may be such groups as chloro, bromo, nitro, acetoxy, acetamido, phenyl, benzyl, alkyl and alkoxy of 1 to 9 carbon atoms, and cycloalkyl of 3 to 8 carbon atoms.

Operable hydantoin glycols are those of the formula:

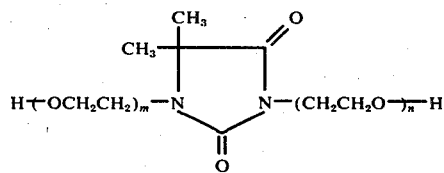

wherein $m + n$ are 2 to 22 and $m$ and $n$ are each at least 1.

Operable mercaptocarboxylic acids include but are not limited to thioglycollic acid (mercaptoacetic acid), α-mercaptopropionic acid, β-mercaptopropionic acid, 4-mercaptobutyric acid, mercaptovaleric acids, mercaptoundecyclic acid, mercaptostearic acid, and o- and p-mercaptobenzoic acids. Preferably, thioglycollic or β-mercaptopropionic acid is employed. Mixtures of various mercaptocarboxylic acids are operable as well.

The polythiol esters are prepared by the esterification of the hydantoin glycol with mercaptocarboxylic acid in the presence of an acid catalyst, the water formed during the reaction being removed as an azeotrope in a suitable solvent.

The reaction is carried out at atmospheric pressure at a temperature in the range of from 60° to about 150° C, preferably from 60° to 110° C. for a period of 30 minutes to about 24 hours.

Suitable acid catalysts include but are not limited to p-toluenesulfonic acid, sulfuric acid, hydrochloric acid and the like. Useful inert solvents include but are not limited to saturated aliphatic hydrocarbons, aromatic hydrocarbons, chlorinated hydrocarbons, ethers, ketones, etc. Representative non-limiting examples of solvents include toluene, benzene, xylene, chloroform, 1,2-dichloroethane, etc.

In summary, by admixing the novel hydantoin glycol based polyenes and polythiols and thereafter exposing the mixture at ambient conditions to a free radical generator, a solid, cured insoluble polythioether product having a high percent elongation is obtained.

Prior to curing, the polyene and polythiol components are admixed in a suitable manner so as to form a homogeneous solid curable mixture. Thus, the polyene and polythiol reactants can be admixed without the necessity of using a solvent at room temperature or slightly elevated temperatures up to about 80° C when one of the components is a solid or, if desired, the reactants may be dissolved in a suitable solvent and thereafter the solvent can be removed by suitable means such as evaporation.

To obtain the maximum strength, solvent resistance, creep resistance, heat resistance and freedom from tackiness, the reactive components consisting of the polyenes and polythiols are formulated in such a manner as to give solid, crosslinked, three dimensional network polythioether polymer systems on curing. In order to achieve such infinite network formation, the individual polyenes and polythiols must each have a functionality of at least 2 and the sum of functionalities of the polyene and polythiol components must always be greater than 4. Blends and mixtures of various polyenes and various polythiols containing said functionality are also operable herein.

The compositions to be cured in accord with the present invention may, if desired, include such additives as antioxidants, accelerators, dyes, inhibitors, activators, fillers, thickeners, pigments, anti-static agents, flame-retardant agents, surface-active agents, extending oils, plasticizers and the like within the scope of this invention. Such additives are usually preblended with the polyene or polythiol prior to or during the compounding step. The aforesaid additives may be present in quantities up to 500 or more parts based on 100 parts by weight of the polyene-polythiol curable compositions and preferably 0.005–300 parts on the same basis.

The polythioether-forming components and compositions, prior to curing may be admixed with or blended with other monomeric and polymeric materials such as thermoplastic resins, elastomers or thermosetting resin monomeric or polymeric compositions. The resulting blend may be subjected to conditions for curing or co-curing of the various components of the blend to give cured products having unusual physical properties.

Although the mechanism of the curing reaction is not completely understood, it appears most likely that the curing reaction may be initiated by most any free radical generating source which dissociates or abstracts a hydrogen atom from an SH group, or accomplishes the equivalent thereof. Generally, the rate of the curing reaction may be increased by increasing the temperature of the composition at the time of initiation of cure. In most applications, however, the curing is accomplished conveniently and economically by operating at ordinary room temperature conditions.

Operable curing initiators or accelerators include radiation such as actinic radiation, e.g., ultraviolet light, lasers; ionizing radiation such as gamma radiation, x-rays, corona dischage, etc.; as well as chemical free radical generating compounds such as azo, peroxidic, etc., compounds.

Azo or peroxidic compounds (with or without amine accelerators) which decompose at ambient conditions are operable as free radical generating agents capable of accelerating the curing reaction include benzoyl peroxide, di-t-butyl peroxide, cyclohexanone peroxide with dimethyl aniline or cobalt naphthenate as an accelerator; hydroperoxides such as hydrogen peroxide, cumene hydroperoxide, t-butyl hydroperoxides; peracid compounds such as t-butylperbenzoate, peracetic acid; persulfates, e.g., ammonium persulfate; azo compounds such as azobis-isobutyronitrile and the like.

These free radical generating agents are usually added in amounts ranging from about 0.001 to 10 percent by weight of the curable solid polyene-polythiol composition, preferably 0.01 to 5 percent.

The curing period may be retarded or accelerated from less than 1 minute to 30 days or more.

Conventional curing inhibitors or retarders which may be used in order to stabilize the components or curable compositions so as to prevent premature onset of curing may include hydroquinone; p-tert-butyl catechol; 2,6-di tert-butyl-p-methylphenol; phenothiazine; N-phenyl-2-naphthylamine; phosphorous acid; pyrogallol and the like.

The preferred free radical generator for the curing reaction is actinic radiation, suitably in the wavelength of about 2000 to 7500A, preferably for 2000 to 4000A.

A class of actinic light useful herein is ultraviolet light, and other forms of actinic radiation which are normally found in radiation emitted from the sun or from artificial sources such as Type RS Sunlamps, carbon arc lamps, xenon arc lamps, mercury vapor lamps, tungsten halide lamps and the like. Ultraviolet radiation may be used most efficiently if the photocurable polyene/polythiol compostion contains a suitable photocuring rate accelerator. Curing periods may be adjusted to be very short and hence commierically economical by proper choice of ultraviolet source, photocuring rate accelerator and concentration thereof, temperature and molecular weight, and reactive group functionality of the polyene and polythiol. Curing periods of less than about 1 second duration are possible, especially in thin film applicatons such as desired, for example, in coatings, adhesives and photoimaged surfaces.

Various photosenitizers, i.e. photocuring rate accelerators are operable and well known to those skilled in the art. Example of photosensitizers include, but are not limited to, benzophenone o-methoxybenzophenone, acetophenone, o-methoxyacetophenone, acenaphthene-quinone, methyl ethyl ketone, valerophenone, hexanophenone, γ-phenylbutyrophenone, p-morpholinopropiophenone, dibenzosuberone, 4-morpholinobenzophenone, benzion, benzoin methyl ether, 4'-morpholinodeoxybenzoin, p-diacetylbenzene, 4-aminobenzophenone, 4'-methoxyacetophenone, benzaldehyde, o-methoxybenzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen 9-one, xanthene-9-one, 7-H-benz[de]anthracen-7-one, 1-naphthaldedhyde, 4,4′-bis(dimethylamino)benzophenone, fluorene9-one, 1′-acetonaphthone, 2′-acetonapthone, triphenylphosphine, tri-o-tolylphosphine, acetonaphthone and 2,3-butanedione, benz[a]anthracene 7,12 dione, etc., which serve to give greatly reduced exposure times and thereby when used in conjunction with various forms of energetic radiation yield very rapid, commercially practical time cycles by the practice of the instant invention.

These photocuring rate accelerators may range from about 0.005 to 50 percent by weight of the photocurable polyenepolythiol composition, preferably 0.05 to 25 percent.

The mole ratio of the ene/thiol groups for preparing the curable composition is from about 0.2/1.0 to about 8/1.0, and preferably from 0.5/1.0 to about 2/1.0 group ratio.

The curable hydantoin glycol derived polyene and polythiol compositions are used in preparing solid, cured crosslinked insoluble polythioether polymeric products having many and varied uses, examples of which include, but are not limited to, coatings; adhesives; films; molded articles; imaged surfaces, e.g., solid photoresists; solid printing plates; e.g., offset, lithographic, letterpress, gravures, etc., silverless photographic materials and the like.

Since the cured materials formed from the polyenepolythiol composition possess various desirable properties such as resistance to severe chemical and physical environments and have a high percent elongation, they are particularly useful for preparing coatings.

A general method for preparing coatings, comprises coating the curable composition on a solid surface of a substrate such as plastic, rubber, glass, ceramic, metal, paper and the like; exposing directly to radiation, e.g., U.V. light until the curable composition cures and cross-links in the exposed areas. The resulting products are cured coatings on suitable substrates or supports.

In forming the composition comprised of the polythiol and the polyene, it is desirable that the photocurable composition contain a photocuring rate accelerator from about 0.005 to 50 parts by weight based on 100 parts by weight of the aforementioned polyene and polythiol.

It is to be understood, however, that when energy sources, e.g., ionizing radiation, other than visible or ultraviolet light, are used to initiate the curing reaction, photocuring rate accelerators (i.e., photosensitizers, etc.) generally are not required in the formulation.

When U. V. radiation is used for the curing reaction, a dose of 0.0004 to 6.0 watts/cm$^2$ is usually employed.

The following examples will aid in explaining, but should not be deemed limiting, the instant invention. In all cases unless otherwise noted, all parts and percentages are by weight.

EXAMPLE I

To a 3,000 ml. resin kettle equipped with stirrer, thermometer, nitrogen inlet and outlet and vented addition funnel was charged under a nitrogen blanket 959.4 grams of commercially available trimethylolpropane diallyl ether and 0.98 grams of stannous octoate catalyst. 1,000 grams of commercially available isophorone diisocyanate was charged to the addition funnel and added dropwise to the kettle with stirring over a 4 ½ hour period while maintaining the temperature below 70° C. After the isophorone diisocyanate was completely added, the temperature was allowed to drop to room temperature (24° C), the nitrogen blanket discontinued and the reaction was stirred for 48 hours.

To a separate 1,000 ml. resin kettle equipped with stirrer, thermometer, nitrogen inlet and outlet and vented addition funnel was charged 535 grams of the reaction product from above along with 16 drops of stannous octoate. 301.3 grams of commercially available pentaethoxylated N,N′-bis(2-hydroxyethyl) dimethylhydantoin was charged to the addition funnel and thereafter added dropwise to the resin kettle with stirring while maintaining the temperature below 70° C. The resultant polyene product of the formula:

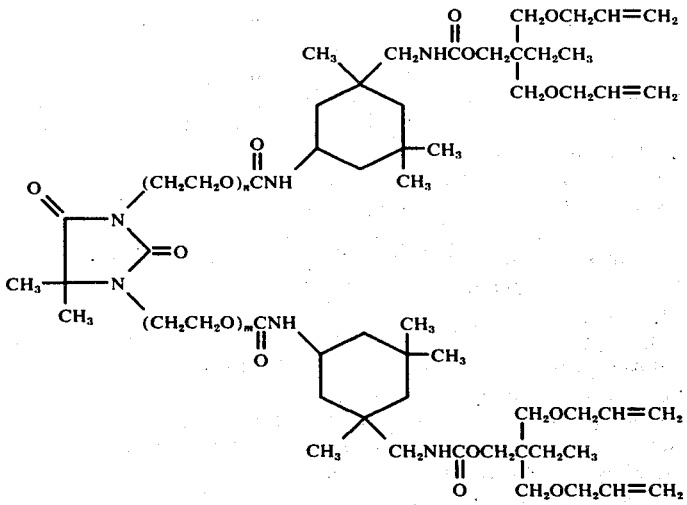

wherein $m + n$ equals 7 and the polyene product had a carbon to carbon unsaturation content of 2.9 mmmoles/g.

This polyene will be referred to hereinafter as Polyene A.

EXAMPLE II

To a 3,000 ml. resin kettle equipped with stirrer, thermometer; nitrogen inlet and outlet and vented addition funnel was charged under a nitrogen blanket 261 grams of commercially available tolylene diisocyanate. 87 grams of commercially available allyl alcohol was added to the addition funnel and thereafter added dropwise to the resin kettle with stirring while maintaining the temperature below 85° C. After 1 ½ hours the addition was complete and the reaction was stirred for an additional 1 ½ hours at which time the isocyanate was analyzed and was found to be 4.26 meq./g.

325 grams of the reaction product was transferred to a 200 ml. resin kettle similarly equipped as above and containing 400 ml. chloroform and 0.25 gram stannous octoate. 151.3 grams of commercially available N,N'-bis(2-hydroxyethyl) dimethylhydantoin was added to the resin kettle and a definite exotherm was noted. The NCO band in the IR was followed until disappearance. The material was transferred to a blender and petroleum ether was added to precipitate the product as a fine white powder. The powder was filtered and dried in vacuo. It contained a carbon-to-carbon unsaturation of 2.7 mmoles/g. This resulting polyene has the formula:

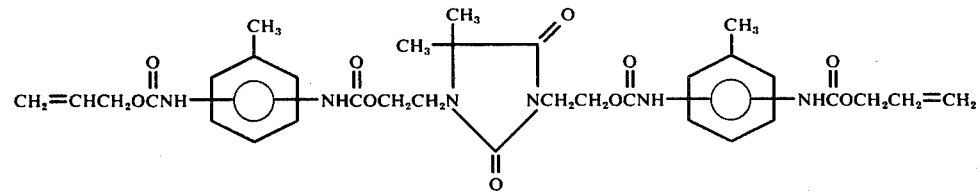

This polyene will hereinafter be referred to as Polyene B.

EXAMPLE III

To a 1,000 ml. resin kettle equipped with stirrer, thermometer, nitrogen inlet and outlet and vented addition funnel was charged 294.8 grams of commercially available tolylene diisocyanate. 365.2 grams of trimethylolpropane diallyl ether was charged to the addition funnel and thereafter added dropwise to the resin kettle under a nitrogen atmosphere while maintaining the temperature below 28° C. After the addition was complete the material was stirred for about 4 hours. The material had a NCO content of 2.47 meq./g.

To another 1,000 ml. resin kettle equipped with stirrer, thermometer, nitrogen inlet and outlet and an addition funnel was charged 200 grams of commercially available pentadecaethoxylated N,N'-bis(2-hydroxyethyl dimethylhydantoin having an OH content of 1.95 meq./g. along with 3 drops of stannous octoate. 157.2 grams of the reaction product of the tolylene diisocyanate and the trimethylolpropane diallyl ether reaction supra was charged to the addition funnel and thereafter added dropwise to the resin kettle. The temperature was maintained below 58° C. during the 4½ hours of addition. The reaction was stirred for an additional 21 hours during which time the NCO content was monitored by IR scans. The resultant polyene had a carbon to carbon unsaturation of 2.35 mmoles/g. and had the formula:

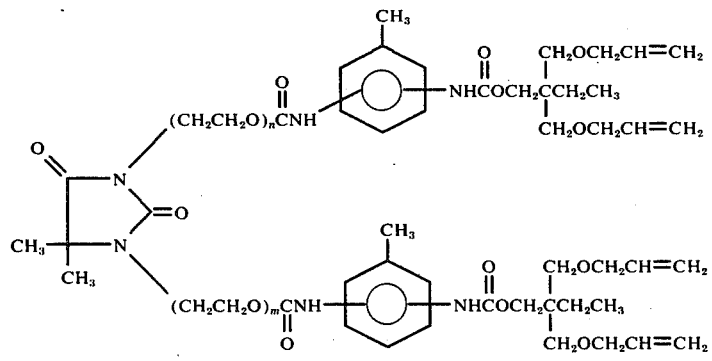

wherein $m + n$ is 17.

This polyene will hereafter be referred to as Polyene C.

EXAMPLE IV

Example III was repeated except that 226 grams of the reaction product of tolylene diisocyanate and trimethylolpropane diallyl ether was added to 200 grams of commercially available decaethoxylated N,N'-bis(2-hydroxyethyl)dimethylhydantoin. The resultant polyene had a C=C content of 2.72 meq./g. and had the formula:

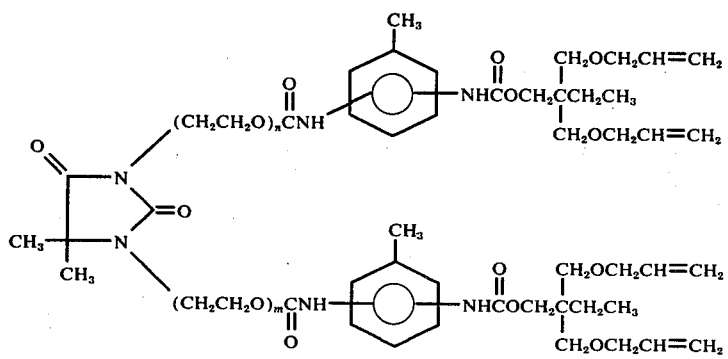

wherein m + n is 12.

This polyene will hereinafter be referred to as polyene D.

EXAMPLE V

Example III was repeated except that 326 grams of the reaction product of tolylene diisocyanate and trimethylolpropane diallyl ether was added to 200 grams of commercially available pentaethoxylated N,N'-bis(2-hydroxyethyl) dimethylhydantoin. The resultant polyene had a carbon to carbon unsaturation of 3.17 mmoles/g. and had the formula:

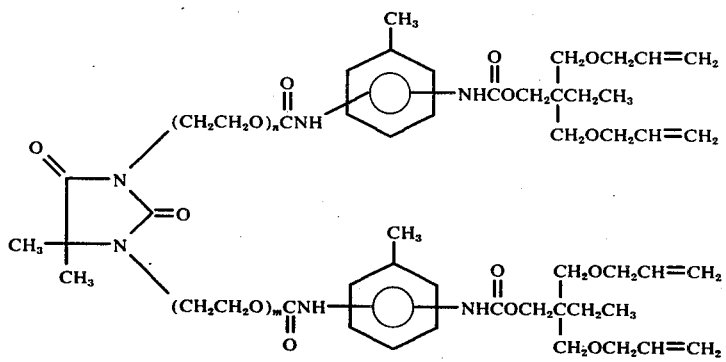

wherein m + n is 7.

This polyene will hereinafter be referred to as Polyene E.

EXAMPLE VI

TO a 3,000 ml. resin kettle equipped with stirrer, thermometer, nitrogen inlet and outlet and addition funnel was charged under a nitrogen blanket 250 grams of commercially available tolylene diisocyanate along with 0.28 grams of stannous octoate catalyst. 323.14 grams of diallyl malate was charged to the addition funnel and thereafter added dropwise to the resin kettle with stirring while maintaining the temperature below 58° C. The reaction was continued for 4 hours. 529 grams of the reaction product was transferred to a dropping funnel and thereafter added dropwise to a 2,000 ml. resin kettle containing 147.4 grams of commercially available N,N'-bis(2-hydroxyethyl) dimethylhydantoin and 0.39 grams stannous octoate. The reaction thickened as addition continued and the temperature was allowed to rise to about 100° C to permit stripping. An additional 0.39 grams of stannous octoate was added to the reaction and the reaction was continued for 51 hours at which time the IR scan showed zero NCO. The resultant polyene had a C=C content of 4.06 mmoles/g. and was of the formula:

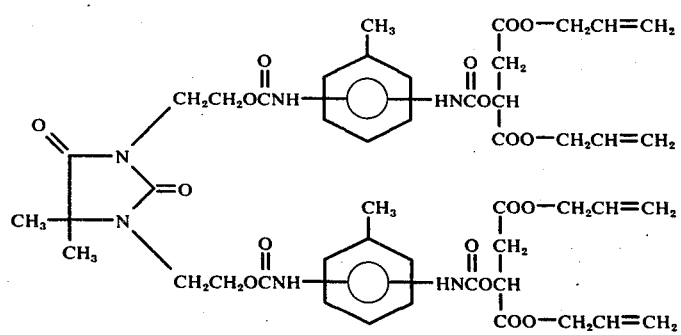

This polyene will hereinafter be referred to as Polyene F.

The following examples show the preparation of a polythiol derived from a hydantoin glycol.

EXAMPLE VII

To a 2,000 ml. 3-necked flask equipped for distillation with stirrer and nitrogen inlet was charged 432 grams (2 moles) of commercially available N,N'-bis(2-hydroxyethyl) dimethylhydantoin, 445 grams of mercaptopropionic acid and 17.5 grams p-toluenesulfonic acid. 100 ml. of ethylene dichloride was added to the flask. The mixture was heated with stirring for 8 hours and the evolved water was continuously removed by azeotropic distillation at 71°–75° C, returning the ethylene dichloride to the reaction flask. The solution in the flask was then washed once with about 1,000 ml. water, twice with about 1,000 ml. of 5 percent sodium bicarbonate and finally with about 1,000 ml. of water. The solution was dried over anhydrous magnesium sulfate, mixed with 10 g. of decolorizing carbon and filtered. The solvent was removed by vacuum distillation, affording 672 g. of product or an 86 percent yield of the following polythiol:

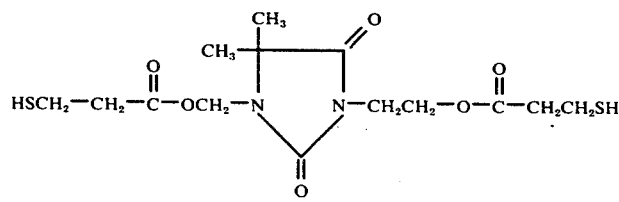

This polythiol will be referred to hereinafter as Polythiol Z.

EXAMPLE VIII

To a 2 liter, 3-necked, round-bottom flask equipped with stirrer, thermometer, Dean-Stark trap and reflux condenser was charged 216 grams of commercially available N,N'-bis(2-hydroxyethyl) dimethylhydantoin, 193.2 grams of thioglycollic acid, 8.18 grams of p-toluenesulfonic acid and 500 ml. of benzene. The mixture was heated to reflux temperature with stirring. The amount of water collected in the Dean-Stark trap was periodically determined and the reaction was stopped when 39.5 ml. water was collected. The mixture was cooled to room temperature, washed with 500 ml. water then twice washed with 500 ml. of a 5 percent NaHCO₃ solution followed by an additional 500 ml. water wash. The benzene layer was removed and dried over 60 grams anhydrous MgSO₄. 2.5 grams decolorizing carbon was then added to the mixture and it was filtered through a fritted filter with the aid of a vacuum. The benzene was stripped off under high vacuum in a flash evaporated to give the polythiol in the amount of 293 grams (80.5 percent yield). On analysis the product had an SH content of 4.96 meq. SH/g., a COOH content of 0.02 meq. COOH/g. and an ester content of 6.07 meq. ester/g. The polythiol had the formula:

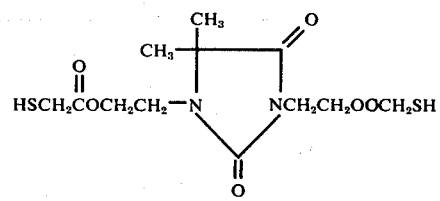

The following examples show the ability of the polyenes and polythiols herein to form cured polythioethers on exposure to actinic radiation. The polyenes and polythiols herein when cured together result in cured materials having a high percent of elongation on failure as compared to other commercially available polyenes and polythiols.

EXAMPLE IX

The following formulations were prepared in 200 ml. brown sample bottles. In all cases accurately weighed amounts of the polyene, stabilizers, photosensitizer and polythiol were added to the bottle and admixed until homogeneous before use. When Polyene A (a solid at room temperature 25° C) was used in the formulation, it was heated to 80° C in order to facilitate weighing and handling.

| | Formulation A |
|---|---|
| Weight (g.) | Component |
| 71.4 | Polyene E |
| 28.6 | pentaerythritol tetrakis (mercaptopropionate)- a polythiol commercially available from Cincinnati Milacron Chemicals, Inc., under the tradename "Q-43" |
| 2.0 | benzophenone (photosensitizer) |
| 0.05 | H₃PO₃ (stabilizer) |
| 0.2 | octadecyl-β-(4-hydroxy-3,5-di-t-butyl phenyl) propionate-commercially available from Geigy-Ciba under the tradename "IRGANOX 1076" (stabilizer) |
| 0.1 | 2,6-di-tert-butyl-4-methyl phenol commercially available under the tradename "Ionol" from Shell Chemical Company (stabilizer) |
| | Formulation B |
| Weight (g.) | Component |
| 72.3 | Polyene E |
| 27.7 | ethylene glycol bis (mercaptopropionate)-a polythiol commercially available under the tradename "E-23" from Cincinnati Milacron Chemicals, Inc. |
| 2.0 | benzophenone |
| 0.05 | H₃PO₃ |

-continued

| 0.2 | "IRGANOX 1076" |
| 0.1 | "Ionol" |

Formulation C

| Weight (g.) | Component |
|---|---|
| 69.2 | Polyene E |
| 30.8 | trimethylolpropane tris (mercaptopropionate) a polythiol commercially available from Cincinnati Milacron Chemicals, Inc., under the tradename "P-33" |
| 2.0 | benzophenone |
| 0.05 | $H_3PO_3$ |
| 0.2 | "IRGANOX 1076" |
| 0.1 | "Ionol" |

Formulation D

| Weight (g.) | Component |
|---|---|
| 60.75 | Polyene E |
| 39.25 | Polythiol X from Example VII |
| 2.0 | benzophenone |
| 0.05 | $H_3PO_3$ |
| 0.2 | "IRGANOX 1076" |
| 0.1 | "Ionol" |

Formulation E

| Weight (g.) | Component |
|---|---|
| 79.5 | Polyene A from Example I |
| 30.0 | "Q-43" |
| 2.19 | benzophenone |
| 0.054 | $H_3PO_3$ |
| 0.219 | "IRGANOX 1076" |
| 0.109 | "Ionol" |

Formulation F

| Weight (g.) | Component |
|---|---|
| 65.2 | Polyene A |
| 22.5 | "E-23" |
| 1.95 | benzophenone |
| 0.048 | $H_3PO_3$ |
| 0.195 | "IRGANOX 1076" |
| 0.097 | "Ionol" |

Formulation G

| Weight (g.) | Component |
|---|---|
| 71.3 | Polyene A |
| 30.0 | "P-33" |
| 2.02 | benzophenone |
| 0.050 | $H_3PO_3$ |
| 0.202 | "IRGANOX 1076" |
| 0.101 | "Ionol" |

Formulation H

| Weight (g.) | Component |
|---|---|
| 49.2 | Polyene A |
| 30.0 | Polythiol Z |
| 1.58 | benzophenone |
| 0.039 | $H_3PO_4$ |
| 0.158 | "IRGANOX 1076" |
| 0.079 | "Ionol" |

Each formulation was poured on a glass plate and drawn down to a 20 mil thick film. The film on the plate was exposed to UV radiation for 2 minutes under a UV Ferro lamp at a surface intensity of 7,000 microwatts/cm². The cured samples were measured for percent elongation at failure. The results are shown in Table I.

TABLE I

| Formulation | % Elongation at Failure |
|---|---|
| A | 76 |
| B | 84 |
| C | 66 |
| D | 154 |
| E | 90 |
| F | 75 |
| G | 63 |
| H | 133 |

As can be seen from the results, formulations D and H, consisting of the polyene and polythiol in which both components are derived from a hydantoin glycol, resulted in cured polythioethers having very high percent elongations as compared to the polyenes herein used with commercially available mercaptate esters.

The molecular weight of the polyenes and polythiols of the present invention may be measured by various conventional methods including solution viscosity, osmotic pressure and gel permeation chromatography. Additionally, the molecular weight may be calculated from the known molecular weight of the reactants.

As can be seen from the above detailed description, the subject curable and particularly photocurable compositions comprised of compatible polyenes and polythiols derived fromm hydantoin glycol exhibit extremely satisfactory chemical and physical properties and are versatile curable polymeric systems.

It is understood that the foregoing detailed description is given merely by way of illustration and that many variations may be made therein without departing from the spirit of this invention.

What is claimed is:
1. A process which comprises:
A. applying to the surface of a substrate a layer of a composition consisting essentially of:
1 A polyene of the formula:

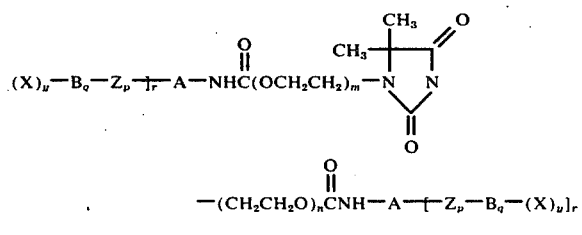

wherein A and B are polyvalent organic radical members free of reactive carbon to carbon unsaturation and are independtly selected from the group consisting of aryl, substituted aryl, aralkyl, substituted aralkyl, cycloalkyl, substituted cycloaklyl, alkyl and substituted alkyl containing 1 to 36 carbon atoms and mixtures thereof, said group members can be connected by a chemically compatible linkage selected from the group consisting of —O—, —S—, carboxylate, carbonate, carbonyl, urethane and substituted urethane, urea and substituted urea, amide and substituted amide, amine and substituted amine and hydrocarbon; Z is a divalent chemically compatible linkage selected from the group consisting of

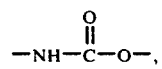

—O— and —S—; X is a member selected from the group consisting of (a) —(CH$_2$)$_d$—CR'=CHR, (b) —O—(CH$_2$)$_d$—CR'=CHR, (c) —S—(CH$_2$)—CR'CR'=CHR, (d) —(CH$_2$)$_d$—C ≡ CR, (e) —O—(CH$_2$)$_d$—C ≡ CR, (f) —S—(CH$_2$)$_d$—C ≡ CR; and mixtures thereof; where R and R' each are independently selected radical; the group consisting of hydrogen and methyl radicals $d$, $p$ and $q$ are each integers from 0 0 to 1; $m$ and $n$ are each integers of at least 1; with $m + n$ from 2 to 22 and $r$ at least 1, and $y$ from 1 to 10; and 2. A polythiol of the formula:

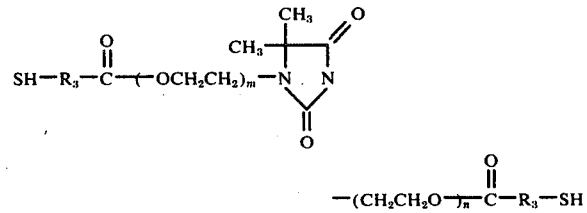

wherein $m$ and $n$ are each at least 1 and $m + n$ is 2 to 22 and $R_3$ is a polyvalent organic radical member free of reactive carbon-to-carbon unsaturation and is selected from the group consisting of aryl; substituted aryl, aralkyl, substituted aralkyl, cylcoalkyl, substituted cycloalkyl, alkyl and substituted alkyl groups containing 1 to 16 carbon atoms and mixtures thereof, the total combined functionality of (a) the reactive carbon to carbon bonds per molecule in the polyene and (b) the thiol groups per molecule in the polythiol being greater than 4 and 3. a photocuring rate accelerator and, thereafter, exposing the layer to actinic radiation thereby curing said composition.

2. The process according to claim 1 wherein the actinic radiation is actinic laser radiation.

3. The process according to claim 1 wherein the actinic radiation is ultraviolet light having a wavelenght wavelength about 2000A and about 4000A.

* * * * *

UNITED STATES PATENT AND TRADEMARK OFFICE
CERTIFICATE OF CORRECTION

PATENT NO. : 4,017,650
DATED : April 12, 1977
INVENTOR(S) : Charles R. Morgan

It is certified that error appears in the above-identified patent and that said Letters Patent are hereby corrected as shown below:

In column 21, line 10; insert --[-- before "(X)".

In column 21, lines 38 and 39; delete "(c) $-S-(CH_2)-CR'CR'=CHR$" and insert therefor --(c) $-S-(CH_2)_d-CR'=CHR$--.

In column 22, line 3; delete "radicals;" and insert therefor the word --from--.

In column 22, line 4; after the word "radical" insert --;--

In column 22, line 24; after the word "aryl" delete ";" and insert therefor --,--.

In column 22, line 38; "wavelength: should read --between--.

Signed and Sealed this sixteenth Day of August 1977

[SEAL]

Attest:

RUTH C. MASON
Attesting Officer

C. MARSHALL DANN
Commissioner of Patents and Trademarks